May 2, 1967     H. FLEMMING ETAL     3,317,100

MACHINE FOR MAKING SHORT FIBERS PARTICULARLY FROM GLASS

Filed Aug. 27, 1965

INVENTORS
HERBERT FLEMMING,
GERHARD KUHNE

3,317,100
MACHINE FOR MAKING SHORT FIBERS PARTICULARLY FROM GLASS

Herbert Flemming and Gerhard Kuhne, Dresden, Germany, assignors to VEB Glasfaserwerk Steinach, Steinach, Thuringia, Germany
Filed Aug. 27, 1965, Ser. No. 483,179
8 Claims. (Cl. 225—97)

This invention relates to the manufacture of fibers, particularly from glass, in which a large quantity of single filaments are continuously produced and split while they are substantially in one plane.

A machine is known which forms cut strands of fibers made of thermoplastic materials particularly mineral substances and preferably glass. The strands used consist basically of fine single filaments which are combined in the strands in the form of secondary fibers. The production of short fibers is performed by producing a strand between two comparatively yielding surfaces whereby the strands are sheared off while they are still in contact with these surfaces. This machine comprises a pair of rotating elements in lateral engagement with each other, at least one of these elements being provided with a yielding surface while the other element is provided with shearing means. During the shearing process, the strand will be pressed by the shearing means against the surface of a counter roller and crushed on its surface. The result is the formation of relatively large quantities of chippings which adversely affects the health of the operator and further results in an unusual wear, particularly on the machine bearings. The required power for this type of crushing and grinding is relatively high since high pressure is necessary.

Therefore, the cutting process can only take place over a relatively small width of the machine at one time.

In the making of a glass fiber fleece, it is therefore necessary to arrange a multiple cutting device transversely over the whole width of the machine. This adversely influences a uniform formation of the fleece. When the strands are pressed against the counter roller, by means of the shearing device, the single filaments are pressed together at the cutting point. A bunching of the single filaments resulting from the pressing of the fibers together cannot be completely cured by whirling the fibers in the air. This bunching disadvantageously influences the quality of the end product, such as, a fleece which consists primarily of the shortened fiber bunches.

Furthermore, it should be noted that glass fibers of different lengths will be produced due to the resulting forces during the shearing process, although the guiding of the strands by means of the rotating elements have substantially yielding surfaces which should counteract these forces. The shearing devices have to be made of a very hard material, such as high speed steel because of the high pressure applied.

Another machine for making shortened fibers and the further processing to textiles, in which the fibers are floating through the air in the same direction and substantially in the same plane, is known. These fibers are treated in a beating device in which they are subjected to a rhythmic bending stress, whereby they are broken off at desired fiber lengths. Thereafter the single filaments are separated. With this machine the forming of chippings is reduced but the presence of chippings is still sufficiently large to impair the production.

It is true that the required power for separating the single filaments is less than with the machine just described, so that a correspondingly lighter beating device can be employed, which can be used across the whole desired width of the fleece in the machine. However, the construction of such a beating device proves to be quite complicated. The disadvantage of this device is that the splitting of the single filaments in air requires a rather powerful pneumatic pressure, since the fibers have to be tensioned by the air currents in such a manner that they can be split by the impact of the breaking device.

Another disadvantage consists in the fact that the fibers are only approximately evenly impacted by the air. This results in an uneven fiber length which in turn affects the quality of the end product.

It is an object of the invention to make a high quality fiber of short length at relatively low production costs.

It is another object of the invention to provide a device for making inorganic, shortened fibers, particularly from glass, whereby a large quantity of single filaments are continuously produced and separated while they are floating in the air, substantially in one plane and over a relatively wide width.

It is yet another object to provide a sepaarting device which eliminates the forming of chippings and which cuts the fibers into predetermined lengths with a minimum of power.

According to the invention, the single filaments which are not connected with each other are introduced into a bending element consisting of a lower and an upper roller and are crushed in predetermined lengths by a locally limited bending stress.

This method permits the single filaments to be enclosed and guided by the bending elements. It is therefore possible to define the bending process of the fibers up to the locally limited bending stress. In this manner the single filaments can be split into predetermined lengths without the creation of chippings. The required power for the bending strength for inorganic filaments, particularly glass fibers, is relatively low, thus providing a simple construction of the bending elements due to the low pressure required and due to the resulting lower bending strength required by the bending elements, so that the latter can be arranged in relative large lengths. The lower and the upper roller are running synchronously with each other and with the speed of movement of the single filaments floating in the air current. By means of rotation, a high speed of movement of the single filaments is achieved while the synchonous running of the machine eliminates a pulling, or accumulation of the single filaments. The upper roller is arranged with projections whereby the heads thereof are smaller than the critical bending radius of the filaments at which the filaments break. Thereby the minimum low radius at the head of the upper roller will fall short and the single filaments break at this point due to the geometrical form of the upper roller. The lower roller acts as a counter roller either completely or at least at the time of the bending process of the single filaments, due to the effect of the upper roller. This is particularly true in the embodiment in which metals are used as a material for the lower roller. In another embodiment rubber or a rubber like material will be used for the lower roller. Due to the low forces present through the bending of the fibers, it is possible to use a material for the lower roller which has a low air resistance, like plastic or aluminum.

The upper roller and the lower roller are mounted on rotational elements parallel to the axis thereof or oblique to the axis in a predetermined and equidistant fashion. The parallel arrangement results in an even distribution of the shortened fibers, due to the strong air current, which is especially necessary during the forming of the fleece. When the upper roller and the lower roller are arranged oblique to each other, only a part of the single filaments are crushed at the same time at the locally limited bending stress. According to the degree of obliqueness an even power distribution over the total periphery of the rotational elements can be obtained, which results in low energy consumption and increases the durability of the machine. To support the air guidance of the single filaments and to introduce the fibers into the bending elements it is advantageous to provide one of the rotation elements with projections. In order to convert the shortened fibers into a fleece it is advantageous to construct at least one of the rotation elements as a conveyor. This arrangement allows the precollection of the shortened fibers and simplifies the problem of air admission and air distribution. In order to obtain a good fiber stress when using conveyors, a support should be arranged beneath the portion of the conveyor where the bending process takes place.

The various features of novelty which characterize the invention are pointed out with particularity in the claims annexed to and forming a part of the specification. For a better understanding of the invention, its operating advantages and the specific objects attained by its use, reference should be had to the accompanying drawings and descriptive matter in which:

Figure 1:
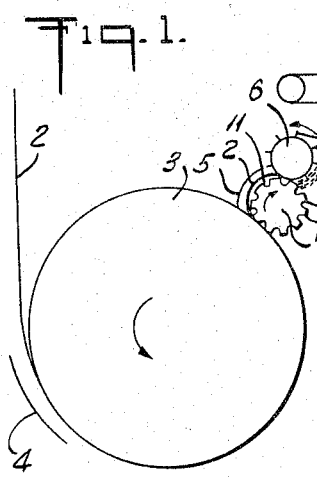
FIG. 1 is a view showing the overall arrangement of the device according to the invention for making short fibers, including the fleece producing device.

Referring now to the drawings, FIG. 1 shows an arrangement disposed with a fiber making machine (not shown). From the fiber making machine single filaments 2 are fed to a drum 3 having a guide plate 4 cooperating therewith. Another guide plate 5 is arranged at the opposite side of drum 3. Guide plate 5 can be coupled with air brushes (not shown). A bending device is arranged in series with guide plate 5. The bending device consists of an upper roller 6 and a lower roller 7 arranged in an adequate distance apart from each other. To assist in an easier breaking of single filaments 2, upper roller 6 is provided with a plurality of projections 10 which engage corresponding grooves 11 provided in lower roller 7. Upper roller 6 and lower roller 7 may be arranged parallel to the axis of rotation as well as oblique thereof. The head of the upper roller is of smaller bending radius than the critical bending radius of single filaments 2. Thus, the upper roller 6 has at each of its projections 10 rounded free edges at the outermost tips of the projections 10, these rounded free edges having a radius of curvature smaller than the bending radius at which a single filament 2 will break, this latter bending radius of the filament 2 being referred to as the critical bending radius thereof. Upper roller 6 can be fixedly mounted or can be axially movable. These rollers could be made of aluminum or plastic.

Figure 2:
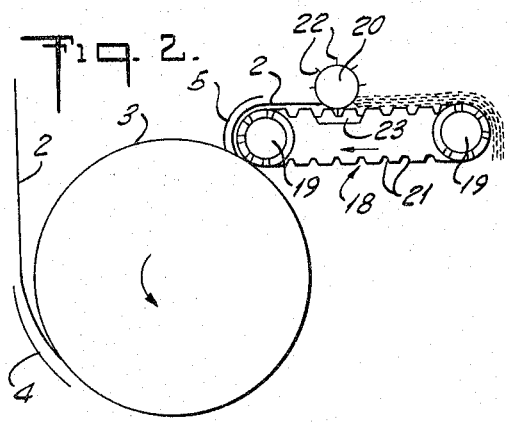
FIG. 2 is a view of another embodiment of the device.
Figure 6:
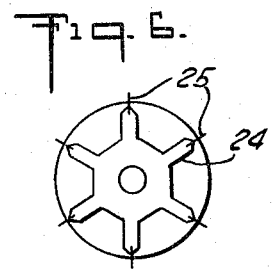
FIG. 6 shows a further embodiment of the upper roller according to FIG. 1.

The bending device may also be arranged in the form of a conveyor as shown in FIG. 2. In this embodiment, two lower rollers 19 are arranged in series over which a conveyor 18 is continuously moving whereby the conveyor is engaged at one point by an upper roller 20. The conveyor is provided with grooves 21 cooperating with projections 22 of upper roller 20. A support 23 is mounted beneath conveyor 18 at the cooperative point of upper roller 20 and conveyor 18. FIG. 6 shows a further embodiment of the upper roller wherein upper roller 24 is formed as a sprocket wheel having projections 25.

Figure 4:
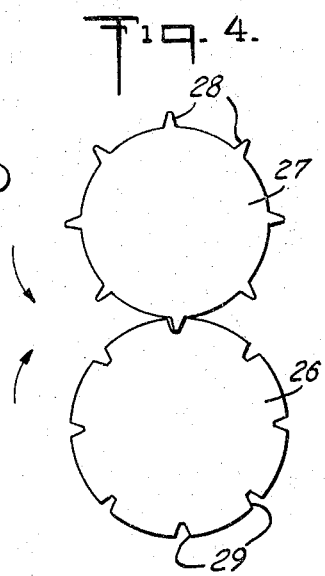
FIG. 4 shows an enlarged view of the upper and the lower roller of the device, according to FIG. 1.
Figure 5:
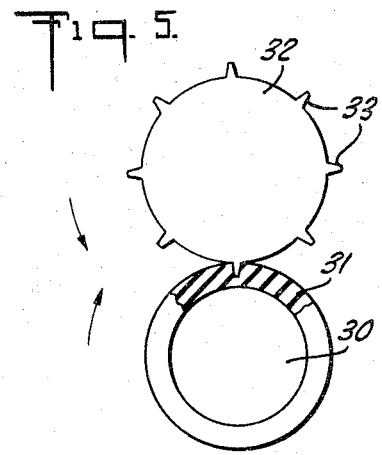
FIG. 5 shows a different embodiment of the upper and lower roller according to FIG. 1.

FIG. 4 shows a further embodiment in which the lower roller 26 acts as a counter roller opposite to an upper roller 27. Upper roller 27 is also provided with projections 28 which engage corresponding grooves 29 of lower roller 26. FIG. 5 shows another arrangement in which a lower roller 30 is provided with an elastic cover 31, for instance, rubber, whereby lower roller 30 acts as a counter roller at the point of coacting with an upper roller 32, whereby projections 33 of upper roller 32 engage the elastic cover 31 of lower roller 30. The bending device may be provided with a fleece forming device as shown in FIG. 1. This fleece forming device consists of an exhaust 13, a fleece forming 14 and a conveyor 15.

Figure 3:
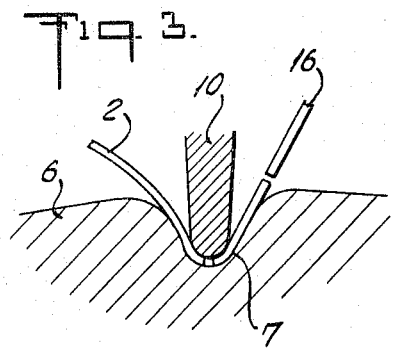
FIG. 3 shows an enlarged and detailed view of the bending process of a single filament according to FIG. 1.

As can be seen in FIG. 1, single filaments 2 are drawn from the fiber making machine by means of drum 3, whereby they are stretched and aligned. Single filaments 2 remain on the surface of drum 3 until they reach guide plate 5. Single filaments 2 are removed from drums 3 by means of guide plate 5 and if necessary with the assistance of air pressure. Guide plate 5 is curved in such a way that single filaments 2 cannot break when they are removed from drum 3. Single filaments 2 are received by the air current and are moved at a larger speed according to the periphery of drum 3 substantially floating in the air, and are introduced into the synchronously moving bending elements. In the bending elements, single filaments 2 are separated into predetermined lengths by upper roller 6 and lower roller 7. A detailed and enlarged view of the bending process and one of the projections 10 of upper roller 6 is shown in FIG. 3. In this figure it can be seen that the rounded tip or edge of the projection 10 of the upper roller 6 provides a minimum loop radius in the filament 2, a locally limited stress is exerted upon single filaments 2 thus bending and breaking single filaments 2. In this way, the shortened fiber 16 of FIG. 1 is produced. These shortened fibers are then moved to exhaust 13 and to fleece forming band 14, and are thereafter deposited onto conveyor belt 15 in the form of a fleece 17. It is possible to provide shortened fibers 16 with a binding material during the fleece forming process in order to obtain a better stability of the end product.

Thus, it will be seen that with the structure of the invention the roller which is provided with the projections 10 has at the outer tip of each projection 10 a rounded edge of a curvature which is less than the critical bending curvature of the single filament 2, so that when the latter is bent around a projection 10 this filament 2 will break because it is bent to an extent greater than the critical bending radius thereof. The elements, such as the rollers 7, 26, or 30, or the conveyor 18, form a means which coacts with the roller which carries the projections 10 for bending the single individual filaments 2 around the rounded edges of the projections 10, thus bending the filaments 2 beyond their critical bending curvature, and in this way breaking the filaments into the individual lengths 16. Because the invention relies upon bending of the filaments in order to break them up into fibers, very little power is required and in fact the material which is used for the roller 6 and the projections 10 thereof can have a resistance to wear which is less than that of the filaments 2 themselves.

This invention should not however be limited to the specific embodiments shown by the appended drawings, but rather defined by the scope of the appended claims.

What is claimed is:

1. In an apparatus for forming into relatively short fibers of predetermined lengths elongated individual filaments made of a material which is brittle enough to break when bent beyond a predetermined critical bending radius, a roller having at its outer surface projections which terminate in tips having rounded free edges of a radius of curvature less than the critical bending radius at which the individual filaments will break, and means coacting with said roller for bending individual filaments around said rounded edges thereof so that said filaments will break.

2. The combination of claim 1 and wherein said roller is situated over said means.

3. The combination of claim 2 and wherein said means is in the form of a lower roller situated beneath said first-mentioned roller.

4. The combination of claim 1 and wherein said means is in the form of a second roller formed at its periphery with recesses for respectively receiving said projections.

5. The combination of claim 1 and wherein said means is in the form of a roller having a soft outer layer receiving said projections while bending the filaments around the rounded free edges thereof.

6. The combination of claim 1 and wherein said means is in the form of an endless conveyor formed with notches which receive said projections.

7. The combination of claim 6 and wherein a stationary reinforcing means is situated next to said conveyor in the region of said roller reinforcing said conveyor while the latter bends the filaments around said rounded free edges of said projections.

8. The combination of claim 1 and wherein said roller and the projections thereof are made of a material which has a resistance to wear which is less than the resistance to wear of the filaments themselves.

References Cited by the Examiner

UNITED STATES PATENTS

| | | | |
|---|---|---|---|
| 1,909,235 | 5/1933 | Stuhlmann | 83—913 X |
| 2,745,491 | 5/1956 | Sonneborn et al. | 83—345 X |
| 3,063,608 | 11/1962 | Hupp | 225—97 |
| 3,103,304 | 9/1963 | Nawalanic | 225—97 X |
| 3,118,336 | 1/1964 | Hampshire | 83—913 X |
| 3,128,507 | 4/1964 | Pearson | 225—97 X |

FOREIGN PATENTS 875,087  6/1942  France.

WILLIAM W. DYER, Jr. *Primary Examiner.*

J. M. MEISTER, *Assistant Examiner.*